United States Patent
Jeon

(10) Patent No.: US 12,318,947 B2
(45) Date of Patent: Jun. 3, 2025

(54) RECLINER AUTOMATIC FASTENING SYSTEM AND RECLINER AUTOMATIC FASTENING METHOD

(71) Applicant: BRILS Co., Ltd., Incheon (KR)

(72) Inventor: Jin Jeon, Incheon (KR)

(73) Assignee: BRILS Co., Ltd., Incheon (KR)

(*) Notice: Subject to any disclaimer, the term of this patent is extended or adjusted under 35 U.S.C. 154(b) by 0 days.

(21) Appl. No.: 18/775,083

(22) Filed: Jul. 17, 2024

(65) Prior Publication Data
US 2025/0100149 A1    Mar. 27, 2025

(30) Foreign Application Priority Data
Sep. 25, 2023   (KR) .................. 10-2023-0128017

(51) Int. Cl.
*B25J 9/16* (2006.01)
*B23P 19/04* (2006.01)
(Continued)

(52) U.S. Cl.
CPC ............ *B25J 9/1687* (2013.01); *B23P 19/04* (2013.01); *B23P 19/065* (2013.01); *B25J 13/085* (2013.01); *B25J 15/0019* (2013.01); *B25J 19/023* (2013.01); *G06T 7/001* (2013.01); *G06T 7/70* (2017.01); *B23P 21/002* (2013.01); *B23P 2700/50* (2013.01);
(Continued)

(58) Field of Classification Search
CPC .......... Y10T 29/49766; Y10T 29/4978; B23P 19/065; B23P 21/002; B23P 2700/50; B25J 9/1687; B25J 13/085; B25J 19/023
See application file for complete search history.

(56) References Cited

U.S. PATENT DOCUMENTS

| | | | | |
|---|---|---|---|---|
| 4,104,779 A | * | 8/1978 | Sigmund ................ | B25B 23/14 73/761 |
| 2002/0032956 A1 | * | 3/2002 | Walt, II ................ | B25H 1/0021 29/402.02 |

(Continued)

FOREIGN PATENT DOCUMENTS

| | | | | |
|---|---|---|---|---|
| JP | H08207841 A | * | 8/1996 | ............... B60N 2/90 |
| KR | 10-0747266 B1 | | 8/2007 | |

(Continued)

*Primary Examiner* — Jermie E Cozart
(74) *Attorney, Agent, or Firm* — Bridgeway IP Law Group, PLLC; Jihun Kim

(57) ABSTRACT

Embodiments relate to a recliner automatic fastening system and a recliner automatic fastening method, which allow a cushion of a car seat and a nut of a back frame to be automatically fastened. The system includes an articulated robot installed along a conveyor line of a car seat, a vision check part checking a position of a nut temporarily fastened to the car seat using 2D vision sensing and then notifying the position to the articulated robot, and performing vision sensing on the nut that has been fastened, a nut fastening part installed on the articulated robot and fastening the nut when it moves to the position of the nut that is temporarily fastened by the articulated robot, and a fastening check part checking whether the nut is normally fastened using sensing data obtained by performing vision sensing on the fastened nut received from the vision check part.

11 Claims, 7 Drawing Sheets

(51) Int. Cl.
*B23P 19/06* (2006.01)
*B25J 13/08* (2006.01)
*B25J 15/00* (2006.01)
*B25J 19/02* (2006.01)
*G06T 7/00* (2017.01)
*G06T 7/70* (2017.01)
*B23P 21/00* (2006.01)

(52) U.S. Cl.
CPC ............... *G06T 2207/30164* (2013.01); *Y10T 29/49766* (2015.01); *Y10T 29/4978* (2015.01)

(56) References Cited

U.S. PATENT DOCUMENTS

| | | | | |
|---|---|---|---|---|
| 2011/0023280 | A1* | 2/2011 | Renke | B25B 23/14 |
| | | | | 29/407.02 |
| 2012/0073104 | A1* | 3/2012 | Laursen | F16B 31/028 |
| | | | | 411/9 |
| 2014/0298636 | A1* | 10/2014 | Lee | B23P 21/008 |
| | | | | 29/709 |
| 2015/0059175 | A1* | 3/2015 | Abdallah | B25J 13/085 |
| | | | | 73/1.09 |

FOREIGN PATENT DOCUMENTS

| | | |
|---|---|---|
| KR | 10-1036919 B1 | 5/2011 |
| KR | 10-2011-0067882 A | 6/2011 |
| KR | 10-2016-0012469 A | 2/2016 |
| KR | 10-2020-0023018 A | 3/2020 |
| KR | 10-2020-0034206 A | 3/2020 |

* cited by examiner

RECLINER AUTOMATIC FASTENING SYSTEM AND RECLINER AUTOMATIC FASTENING METHOD

CROSS-REFERENCE TO RELATED APPLICATIONS

This application claims the priority of Korean Patent Application No. 10-2023-0128017 filed on Sep. 25, 2023, in the Korean Intellectual Property Office, the disclosure of which is incorporated herein by reference.

TECHNICAL FIELD

The present disclosure relates to a recliner automatic fastening system and a recliner automatic fastening method, and more specifically, to a recliner automatic fastening system and a recliner automatic fastening method, which allow a cushion of a car seat and a nut of a back frame to be automatically fastened.

BACKGROUND

Generally, various parts such as a head lamp, a hood latch assembly, a bumper beam, a cooling system assembly, and an external oil cooler are installed on the front of a vehicle.

However, recently, in order to improve the assemblability of these parts and reduce the number of work processes, a front end module (FEM) which integrates the parts into a single product by mounting the parts on a carrier, assembling and installing the carrier on a front vehicle body is commonly used.

In order to mount such an insert nut on the carrier, first, the carrier is injection molded so that an insertion hole is formed at a predetermined position on the carrier, the insert nut is inserted into the insertion hole, and then the insert nut is injected and coupled.

However, the above-described conventional insert nut is problematic in that a gap between protrusions formed on an outer circumference of the insert nut is very small, so that injection resin may not be easily injected into the insertion hole and a gap is created between the insertion hole and the insert nut when the injection resin is injected, thereby greatly reducing the coupling rigidity of the insert nut.

The description provided above as a related art of the present disclosure is for helping understand the background of the present disclosure and should not be construed as being included in the related art known by those skilled in the art.

PRIOR ART DOCUMENT

Patent Document (Patent Document 1) Korean Patent Publication No. 10-2011-0067882 (2011 Jun. 22.)
(Patent Document 2) Korean Patent No, 10-0747266 (2007 Aug. 7.)

SUMMARY

In view of the above, the present disclosure provides a recliner automatic fastening system and a recliner automatic fastening method, in which the position of a nut temporarily fastened to a seat is checked by applying 2D vision to a robot and then the nut is fastened, and it is checked whether the nut is fastened using a torque value.

Technical objects to be achieved by the present disclosure are not limited to those described above, and other technical objects that are not mentioned above may also be clearly understood from the descriptions given below by those skilled in the art to which the present disclosure belongs.

The present disclosure provides a recliner automatic fastening system configured to automatically fasten a cushion of a car seat and a nut of a back frame, the system including an articulated robot installed along a conveyor line of a car seat, a vision check part checking a position of a nut temporarily fastened to the car seat using 2D vision sensing and then notifying the position to the articulated robot, and performing vision sensing on the nut that has been fastened, a nut fastening part installed on the articulated robot, and fastening the nut when it moves to the position of the nut that is temporarily fastened by the articulated robot, and a fastening check part checking whether the nut is normally fastened using sensing data obtained by performing vision sensing on the fastened nut received from the vision check part.

In an embodiment, the nut fastening part may fasten the nut until it reaches a preset torque value.

In an embodiment, the fastening check part may check an exposed length of a protruding end of a bolt that has been fastened by the nut fastening part using sensing data received from the vision check part and then deduce a final fastening position of the nut.

In an embodiment, the vision check part may perform 2D vision sensing on a nut fastening process of the nut fastening part and then transmit a sensed result to the fastening check part in real time.

In an embodiment, the fastening check part may check whether a joint of the articulated robot is distorted or the car seat is twisted during fastening of the nut, using sensing data received from the vision check part in real time, and when it is checked that the joint of the articulated robot is distorted or the car seat is twisted, the fastening check part may stop fastening the nut fastening part, re-execute 2D vision sensing by the vision check part, and then re-execute fastening by the nut fastening part.

In an embodiment, the fastening check part may check whether the nut is normally fastened, based on a fastening torque value of the nut and a position of the articulated robot.

In an embodiment, the fastening check part may identify a type of the nut using an insertion depth of the nut, which is detected through 2D vision sensing from a side of the nut using the vision check part.

In an embodiment, the fastening check part may identify the type of the nut using a shape of the nut in a fastened state, which is detected through 2D vision sensing using the vision check part.

The present disclosure provides a recliner automatic fastening method, the method including a nut insertion step in which a nut fastening part enters a position where a nut is temporarily fastened by an articulated robot, a fastening step in which the temporarily fastened nut is fastened to a final fastening position by the nut fastening part, and a fastening completion step in which the fastening check part checks whether the nut is normally fastened using sensing data that is acquired through vision sensing using the vision check part, when the nut fastening part is completely moved to an expected position by the articulated robot.

In an embodiment, in the nut insertion step, a case where the nut fastening part is under-inserted or over-inserted compared to a predetermined insertion depth may be recognized as an error, so that re-insertion of the nut fastening part may be attempted after vision re-photography is performed using the vision check part.

In an embodiment, in the fastening step, a change in position of the articulated robot and a change in torque value of the nut fastening part may be measured, and, when the torque value change of the nut fastening part is measured in a state where a change in position of the articulated robot is less than expected to a final fastening position of the nut, it may be determined that fastening is not completely achieved due to presence of foreign matter.

ADVANTAGEOUS EFFECTS

According to an aspect of the present disclosure, the position of a nut temporarily fastened to a seat is checked by applying 2D vision to a robot and then the nut is fastened, and it is checked whether the nut is fastened using a torque value, thereby minimizing human errors, reducing manpower, and maximizing productivity and efficiency, and consequently enabling a production process to be efficiently performed.

Effects of the present disclosure are not limited to the above-mentioned effects, and various effects will be clearly understood by those skilled in the art from the following claims.

DETAILED DESCRIPTION

Figure 1:
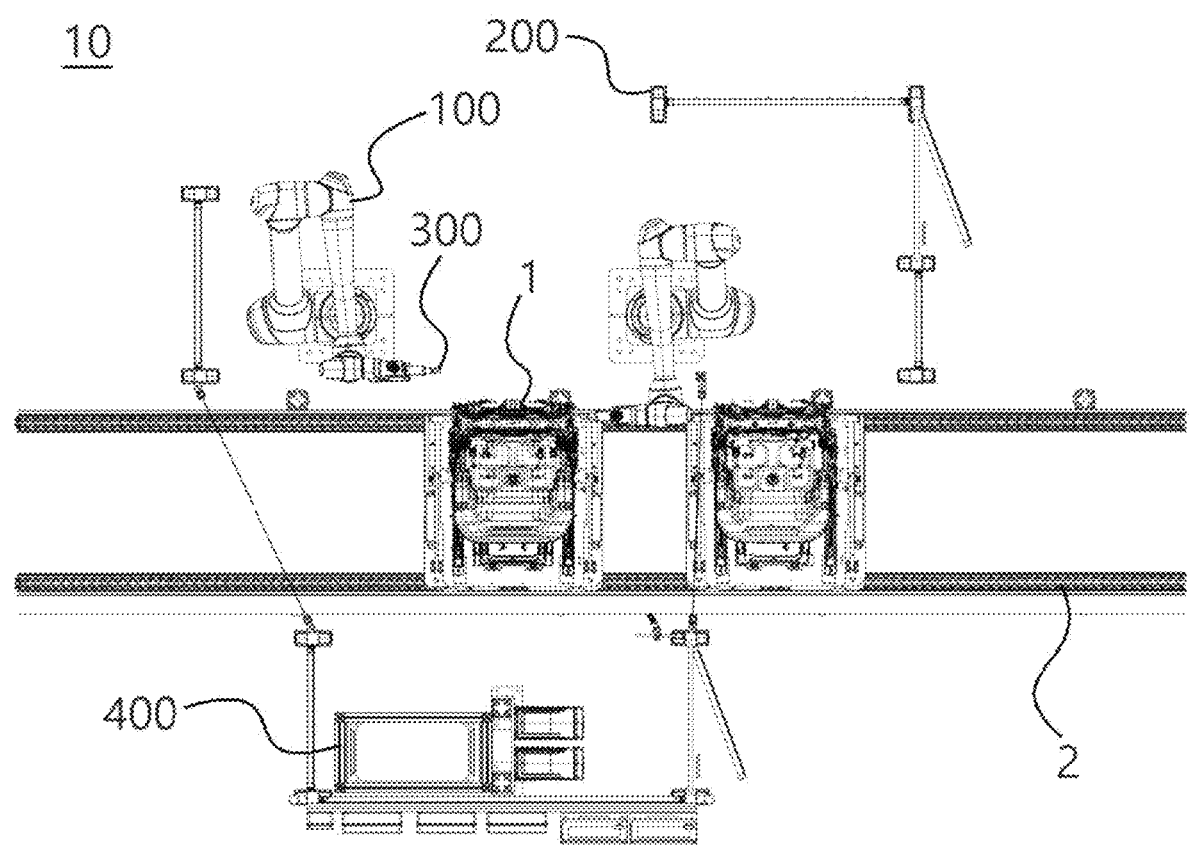
FIGS. 1 and 2 are diagrams showing the schematic configuration of a recliner automatic fastening system according to an embodiment of the present disclosure.

The present disclosure will be described below in detail with reference to the accompanying drawings, which show by way of example specific embodiments in which the present disclosure may be practiced. These embodiments are described in detail to enable those skilled in the art to practice the present disclosure. It should be understood that various embodiments of the present disclosure are different from one another but are not necessarily mutually exclusive. For example, specific shapes, structures and characteristics described herein may be implemented in various ways without departing from the spirit and scope of the present disclosure. Further, it should be understood that the position or arrangement of individual components within each disclosed embodiment may be changed without departing from the spirit and scope of the present disclosure. Accordingly, the detailed description set forth below is not intended to be taken in a limiting sense, and the scope of the present disclosure is defined only by the appended claims and equivalents thereof. Like reference numerals refer to like parts throughout various figures and embodiments of the present disclosure.

Hereinafter, preferred embodiments of the present disclosure will be described in detail with reference to the accompanying drawings.

Figure 2:
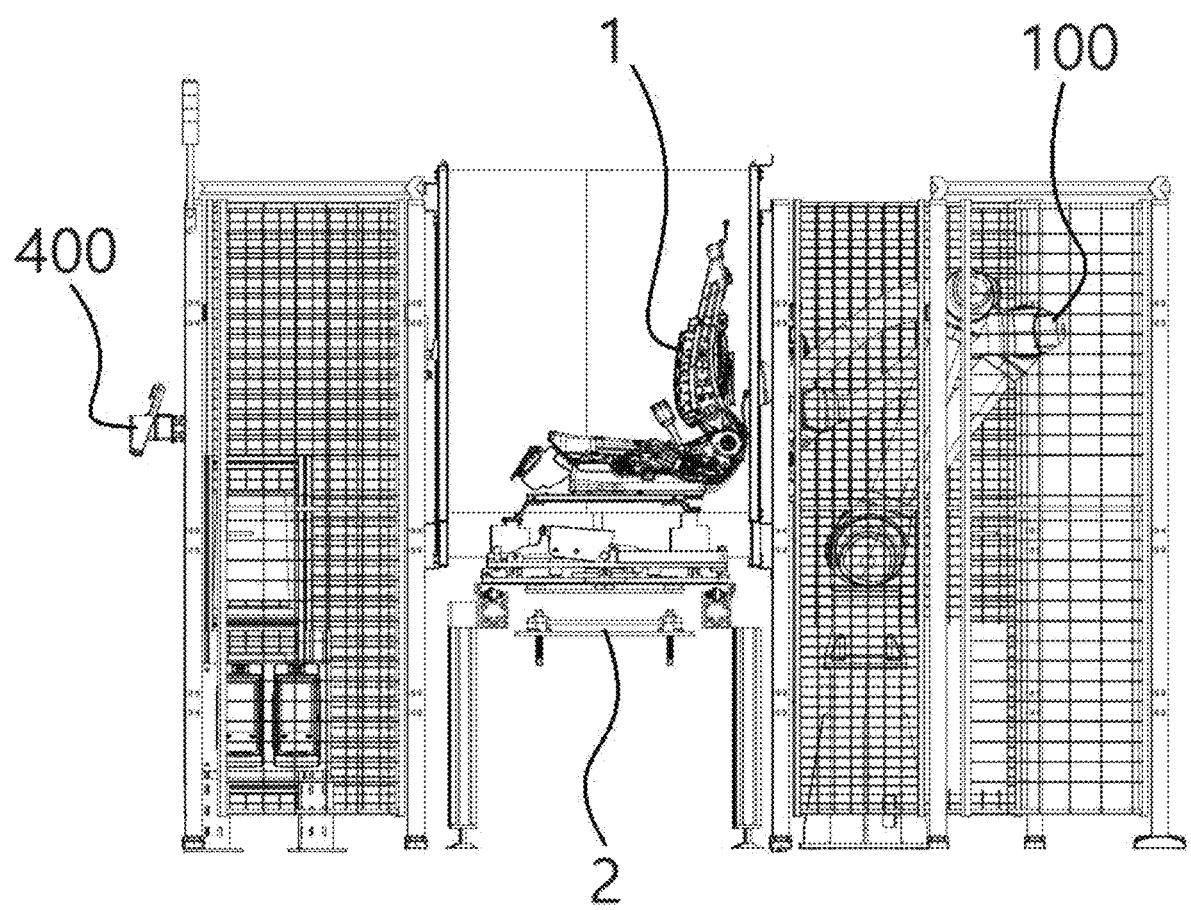

FIGS. 1 and 2 are diagrams showing the schematic configuration of a recliner automatic fastening system according to an embodiment of the present disclosure.

Referring to FIGS. 1 and 2, the recliner automatic fastening system 10 according to an embodiment of the present disclosure includes an articulated robot 100, a vision check part 200, a nut fastening part 300, and a fastening check part 400.

The articulated robot 100 is installed along a conveyor line 2 of a car seat 1, is an articulated robot device equipped with at least one joint, and precisely moves the nut fastening part 300.

The vision check part 200 is installed on the articulated robot 100 or at least one part is installed along the conveyor line 2 of the car seat 1. This checks the position of a nut N temporarily fastened to the car seat 1 using 2D vision sensing and then notifies the position to the articulated robot 100, and performs vision sensing on the nut N that has been fastened.

In an embodiment, the vision check part 200 may perform 2D vision sensing on the nut fastening process of the nut fastening part 300 and then transmit the sensed result to the fastening check part 400 in real time.

The nut fastening part 300 is a nut fastening device capable of precisely adjusting and simultaneously sensing torque, and is installed on the articulated robot 100. When it moves to the position of the nut N that is temporarily fastened by the articulated robot 100, the nut fastening part fastens the nut N.

In an embodiment, the nut fastening part 300 may fasten the nut N until it reaches a preset torque value (i.e., a torque value at which the fastening of the nut N is completed, etc.) by the drive control of the fastening check part 400.

The fastening check part 400 controls the operation of devices such as the articulated robot 100, the vision check part 200, and the nut fastening part 300, and checks whether the nut N is normally fastened using sensing data obtained by performing vision sensing on the fastened nut N received from the vision check part 200.

In an embodiment, the fastening check part 400 may read whether the nut N is normally fastened, by checking the exposed length of a protruding end of a bolt B that has been fastened by the nut fastening part 300 using sensing data received from the vision check part 200 and then deducing a final fastening position of the nut N.

In an embodiment, the fastening check part 400 may check whether the joint of the articulated robot 100 is distorted or the car seat 1 is twisted during the fastening of the nut N, using sensing data received from the vision check part 200 in real time. When it is checked that the joint of the articulated robot 100 is distorted or the car seat 1 is twisted, the fastening check part may stop fastening the nut fastening part 300, re-execute 2D vision sensing by the vision check part 200, and then re-execute fastening by the nut fastening part 300.

In an embodiment, the fastening check part 400 may check whether the nut N is normally fastened, based on the fastening torque value of the nut N and the position of the articulated robot 100.

In an embodiment, the fastening check part 400 may identify the type of the nut N using the insertion depth of the nut N, which is detected through 2D vision sensing from the side of the nut N using the vision check part 200, thereby preventing a different type of nut N from being fastened.

In an embodiment, the fastening check part 400 may identify the type of the nut N using the shape of the nut N in a fastened state detected through 2D vision sensing using the vision check part 200.

The recliner automatic fastening system 10 according to an embodiment of the present disclosure having the above-described configuration may check the position of the nut N temporarily fastened to the seat by applying 2D vision to the robot and then fasten the nut N, and check whether the nut N is fastened using the torque value, thereby minimizing human errors, reducing manpower, and maximizing productivity and efficiency, and consequently enabling a production process to be efficiently performed.

Figure 3:
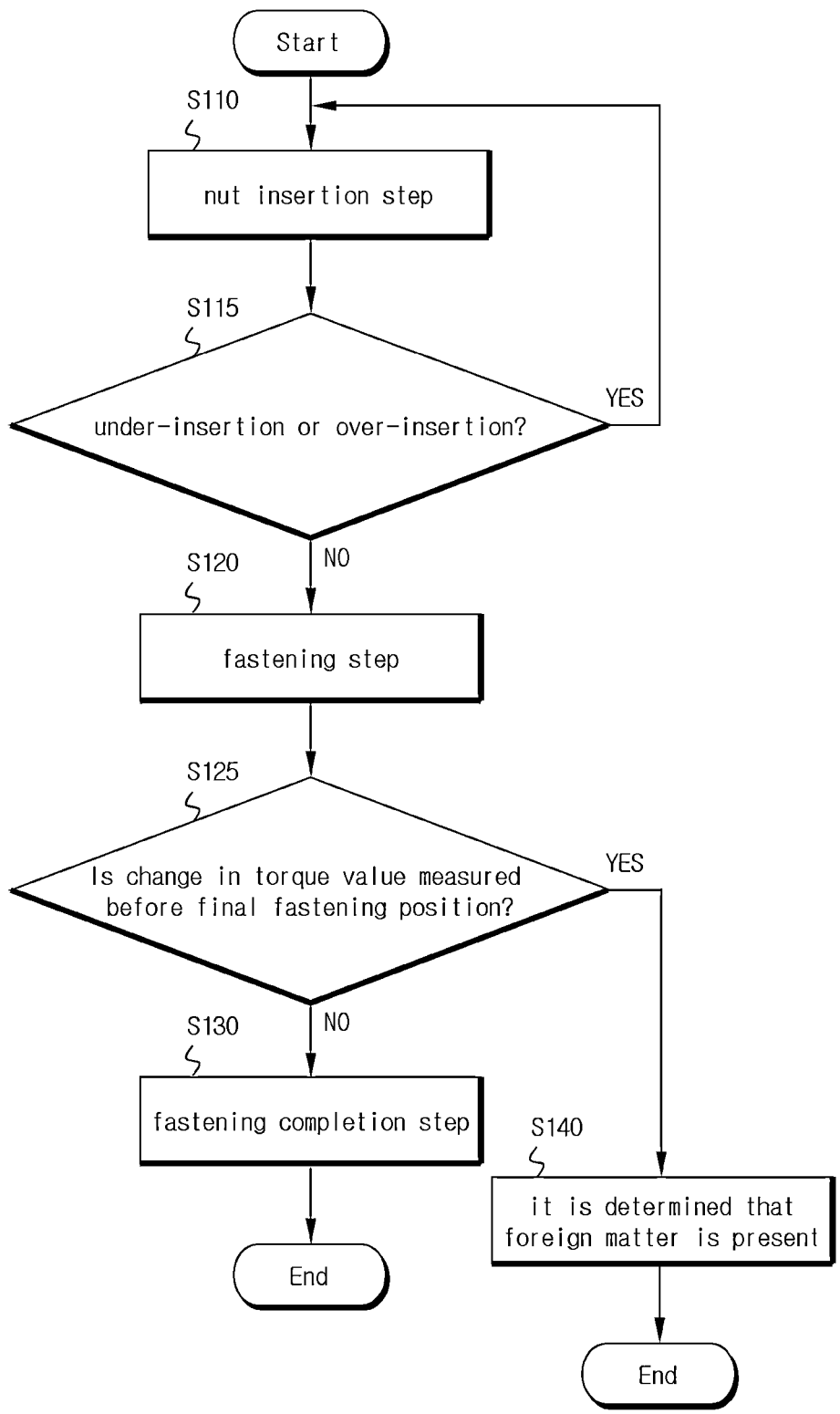
FIG. 3 is a flowchart illustrating a recliner automatic fastening method according to an embodiment of the present disclosure.

FIG. 3 is a flowchart illustrating a recliner automatic fastening method according to an embodiment of the present disclosure.

Referring to FIG. 3, in the recliner automatic fastening method according to an embodiment of the present disclosure, first, the nut fastening part 300 enters a position where the nut N is temporarily fastened by the articulated robot 100 (S110).

Figure 4:
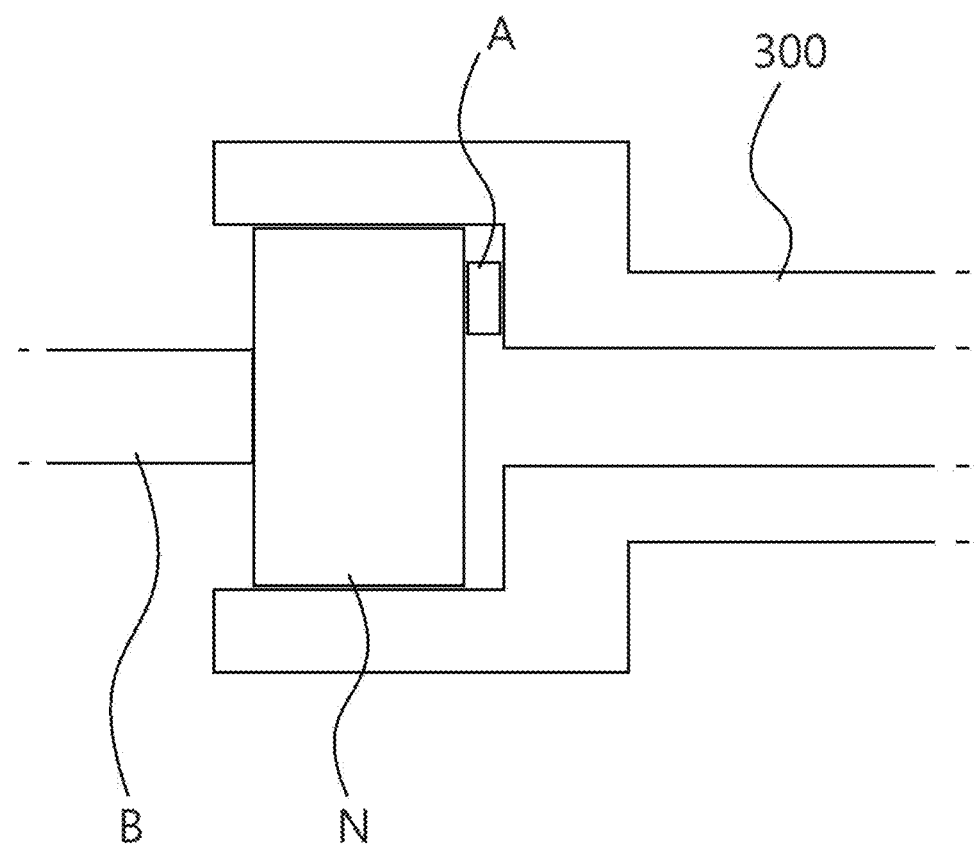
FIGS. 4 to 7 are diagrams showing examples of under-insertion or over-insertion of a nut fastening part of FIG. 1.

In an embodiment, when the nut fastening part 300 is under-inserted or over-inserted compared to a predetermined insertion depth (in the case of Yes in S115), the nut N insertion step S110 may recognize it as an error (e.g., it is determined that foreign matter A or the like is present in the nut N or the nut fastening part 300 as shown in FIG. 4 or the nut is a different type of nut N), so that vision may be re-photographed using the vision check part 200 and then re-insertion S110 of the nut fastening part 300 may be attempted again.

Figure 5:
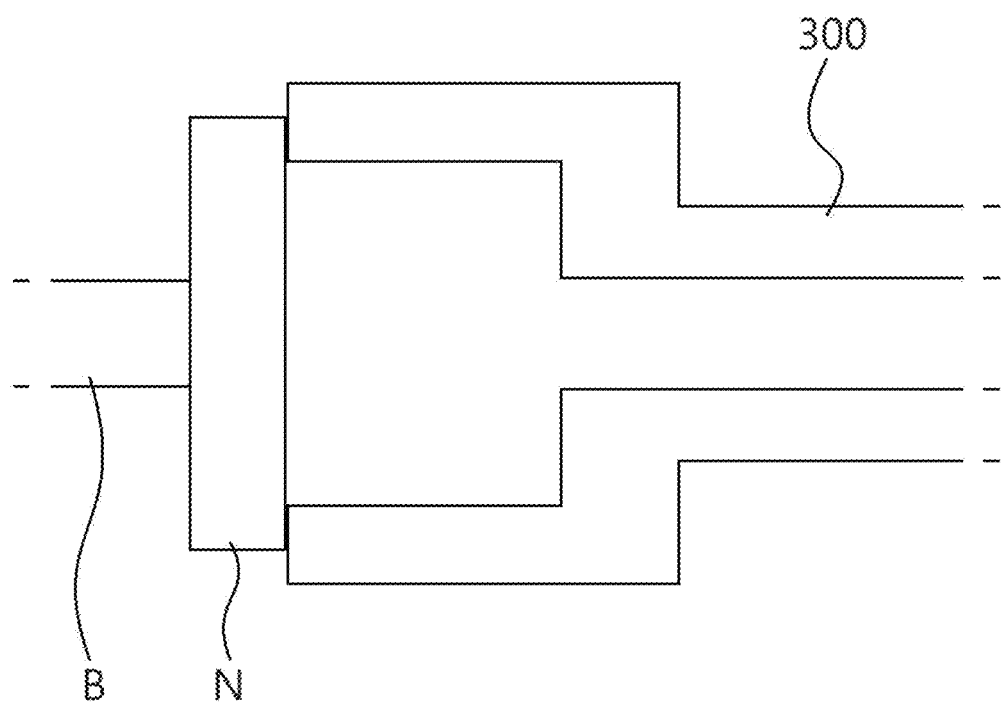
Figure 6:
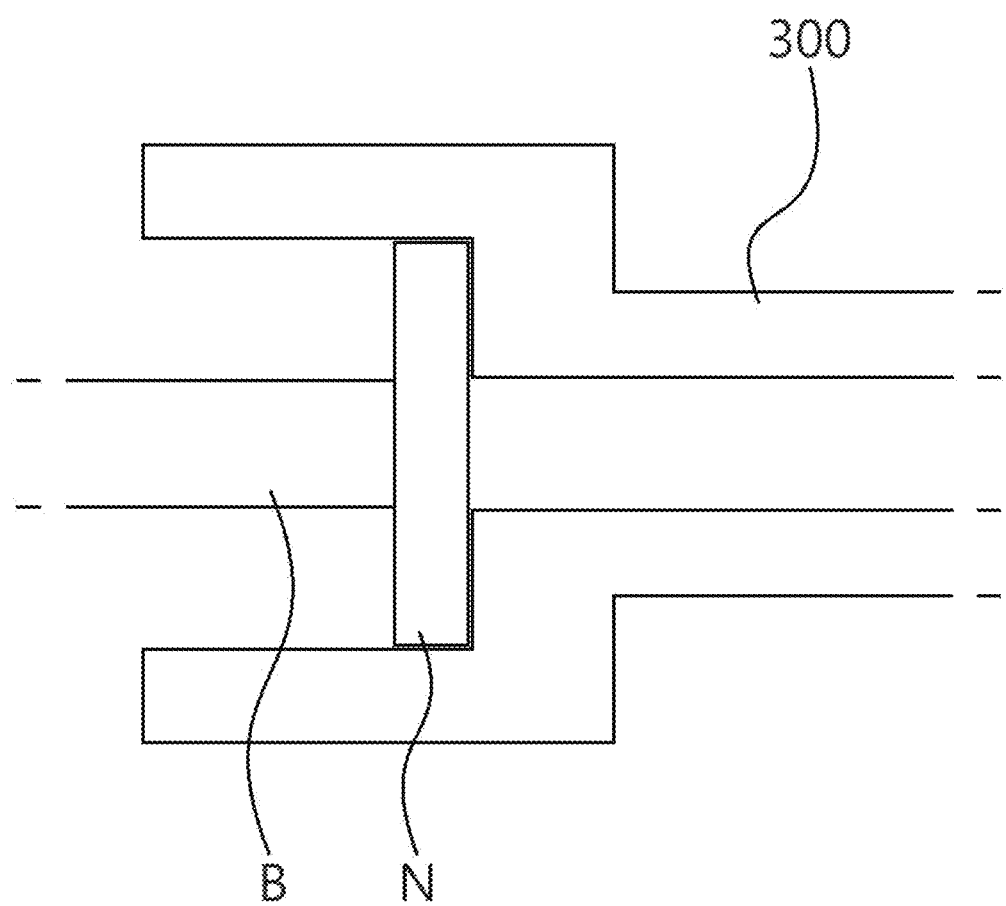
Figure 7:
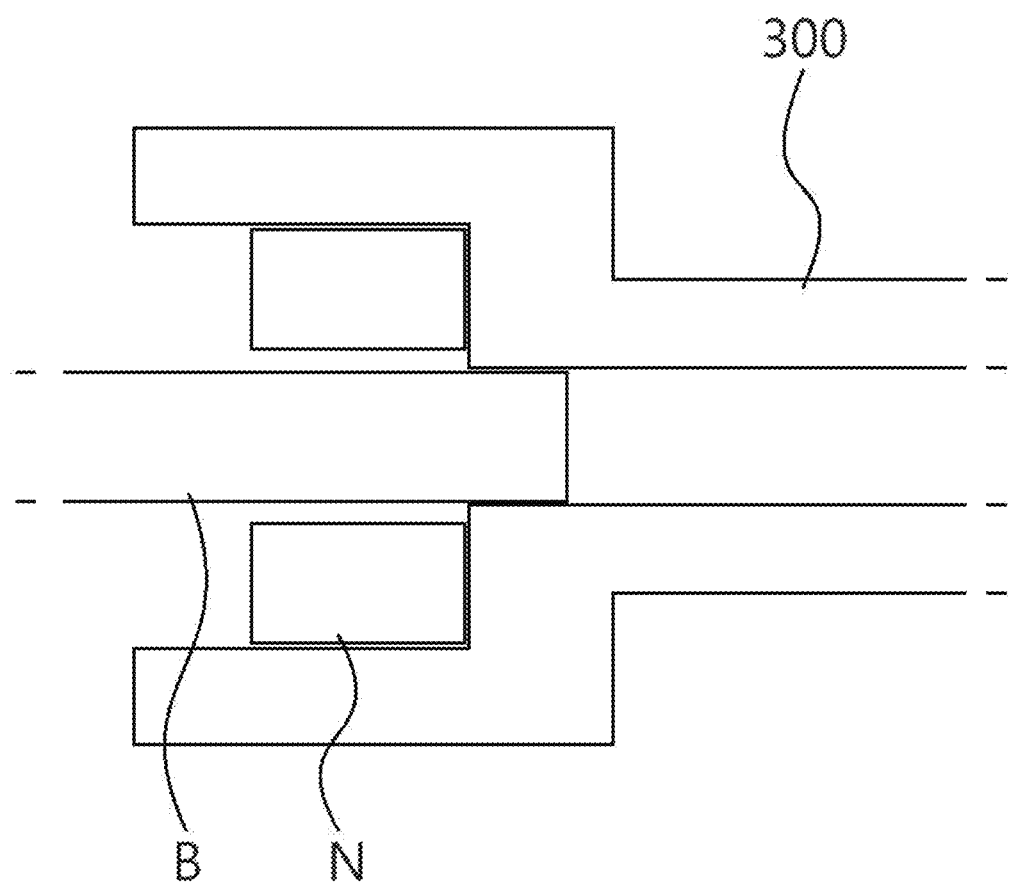

That is, when the nut fastening part 300 is under-inserted due to a different type of nut N having a large diameter as shown in FIG. 5, the nut fastening part 300 is over-inserted due to a different type of nut N having a thin thickness as shown in FIG. 6, or the nut fastening part 300 is over-inserted due to a different type of nut N having a different inner diameter as shown in FIG. 7, the case where the nut fastening part 300 is under-inserted or over-inserted is recognized as an error, so that the re-insertion S110 of the nut fastening part 300 may be attempted again through vision re-photography using the vision check part 200, or a worker may be requested to replace the nut N to ensure precise fastening.

When the nut N inserted in the nut N insertion step S110 is inserted within a normal range (in the case of No in S115), the nut N temporarily fastened by the nut fastening part 300 is fastened to the final fastening position (S120).

In an embodiment, in the fastening step S120, a change in position of the articulated robot 100 and a change in torque value of the nut fastening part 300 are measured. When the torque value change of the nut fastening part 300 is measured in a state where a change in position of the articulated robot 100 is less than expected to a final fastening position of the nut N (in the case of Yes in S125), it is determined that fastening is not completely achieved due to the presence of the foreign matter A (S140), as shown in FIG. 4, and then this is transmitted to the fastening check part 400, so that the steps from the nut N insertion step S110 to the fastening step S120 described above may be performed again.

When the nut fastening part 300 is completely moved to the expected position by the articulated robot 100 (in the case of No in S125), the fastening check part 400 checks whether the nut N is normally fastened using the sensing data that is acquired through vision sensing using the vision check part 200 (S130).

The recliner automatic fastening method according to an embodiment of the present disclosure having the above-described configuration may check the position of the nut N temporarily fastened to the seat by applying 2D vision to the robot and then fasten the nut N, and check whether the nut N is fastened using the torque value, thereby minimizing human errors, reducing manpower, and maximizing productivity and efficiency, and consequently enabling a production process to be efficiently performed.

The above description is merely exemplary description of the technical scope of the present disclosure, and it will be understood by those skilled in the art that various changes and modifications can be made without departing from original characteristics of the present disclosure. Therefore, the aforementioned embodiments should be understood as illustrative in all respects and not as restrictive. For example, each component described as a single unit may be implemented in a distributed manner, and components described as distributed may also be implemented in a combined form.

The protection scope of the present disclosure is indicated by the scope of the claims described below rather than a detailed description, and all changes or modifications derived from claims and equivalences thereof should be construed as being included in the scope of the present disclosure.

DETAILED DESCRIPTION OF MAIN ELEMENTS

10: recliner automatic fastening system
100: articulated robot
200: vision check part
300: nut fastening part
400: fastening check part

What is claimed is:

1. A recliner automatic fastening system configured to automatically fasten a cushion of a car seat and a nut of a back frame, the recliner automatic fastening system comprising:
an articulated robot installed along a conveyor line;
a vision sensor configured to check a position of a nut temporarily fastened to the car seat using 2D vision sensing, then notify the position to the articulated robot, and perform vision sensing on the nut that has been fastened to a final fastening position;
a nut fastener installed on the articulated robot, the nut fastener having a predetermined insertion depth to have the nut therein, the nut fastener being configured to fasten the nut when the nut fastener moves to the position of the nut that is temporarily fastened by the articulated robot; and
a fastening check controller configured to check whether the nut is normally fastened using sensing data received from the vision sensor and obtained by performing the vision sensing on the nut fastened to the final fastening position.

2. The recliner automatic fastening system of claim 1, wherein the nut fastener is configured to fasten the nut until the nut fastener reaches a preset torque value.

3. The recliner automatic fastening system of claim 1, wherein the fastening check controller is configured to check an exposed length of a protruding end of a bolt that has been fastened by the nut fastener using the sensing data received from the vision sensor, the fastening check controller being configured to then deduce a final fastening position of the nut.

4. The recliner automatic fastening system of claim 1, wherein the vision sensor is configured to perform the 2D vision sensing on a nut fastening process of the nut fastener and then transmit a sensed result to the fastening check controller in real time.

5. The recliner automatic fastening system of claim 4, wherein the fastening check controller is configured to check whether a joint of the articulated robot is distorted or the car seat is twisted during fastening of the nut, using sensing data of the sensed result received from the vision sensor in real time, and wherein, when it is checked that the joint of the articulated robot is distorted or the car seat is twisted, the fastening check controller is configured to stop fastening the nut fastener, re-execute the 2D vision sensing by the vision sensor, and then re-execute fastening by the nut fastener.

6. The recliner automatic fastening system of claim 1, wherein the fastening check controller is configured to check whether the nut is normally fastened, based on a fastening torque value of the nut and a position of the articulated robot.

7. The recliner automatic fastening system of claim 1, wherein the fastening check controller is configured to identify a type of the nut using an insertion depth of the nut, which is detected through the 2D vision sensing from a side of the nut using the vision sensor.

8. The recliner automatic fastening system of claim 1, wherein the fastening check controller is configured to identify a type of the nut using a shape of the nut in a fastened state, which is detected through the 2D vision sensing using the vision sensor.

9. A recliner automatic fastening method using the recliner automatic fastening system of claim 1, the recliner automatic fastening method comprising:

inserting the nut fastener into a position where the nut is temporarily fastened by the articulated robot;

fastening the temporarily fastened nut to the final fastening position by the nut fastener; and checking, by the fastening check controller, whether the nut is normally fastened using the sensing data that is acquired through the vision sensing of the nut fastened to the final fastening position using the vision sensor, when the nut fastener is completely moved to an expected position by the articulated robot.

10. The recliner automatic fastening method of claim 9, wherein the inserting the nut fastener into the position includes:

recognizing a case where the nut fastener is under-inserted or over-inserted compared to the predetermined insertion depth as an error, performing a vision re-photography using the vision sensor, and attempting re-insertion of the nut fastener after the vision re-photography is performed.

11. The recliner automatic fastening method of claim 9, wherein the fastening of the temporarily fastened nut includes:

measuring a change in position of the articulated robot and a change in torque value of the nut fastener, and when the change in the torque value of the nut fastener is measured in a state where the change in the position of the articulated robot is less than an expected change in the position to the final fastening position of the nut, determining that fastening is not completely achieved due to presence of a foreign matter.

* * * * *